United States Patent [19]

Sakamoto

[11] Patent Number: 4,468,181
[45] Date of Patent: Aug. 28, 1984

[54] ROTATION PREVENTING DEVICE FOR A SCROLL-TYPE FLUID DISPLACEMENT APPARATUS

[75] Inventor: Seiichi Sakamoto, Gunma, Japan
[73] Assignee: Sanden Corporation, Gunma, Japan
[21] Appl. No.: 356,403
[22] Filed: Mar. 9, 1982
[30] Foreign Application Priority Data
  Mar. 9, 1981 [JP] Japan .................................. 56-33647
[51] Int. Cl.³ .......................... F01C 1/02; F01C 21/02; F16D 3/04; F16C 19/16
[52] U.S. Cl. .................................... 418/55; 464/103; 308/233
[58] Field of Search ............................ 418/55, 57, 59; 464/102, 103, 81, 139; 308/233, DIG. 2

[56] References Cited

U.S. PATENT DOCUMENTS

| | | | |
|---|---|---|---|
| 1,907,447 | 5/1933 | Schiltz | 464/103 |
| 4,160,629 | 7/1979 | Hidden et al. | 418/55 |
| 4,259,043 | 3/1981 | Hidden et al. | 418/55 |

FOREIGN PATENT DOCUMENTS

| | | | |
|---|---|---|---|
| 1960216 | 6/1971 | Fed. Rep. of Germany | 464/103 |
| 928465 | 6/1947 | France . | |
| 976187 | 10/1950 | France . | |

*Primary Examiner*—John J. Vrablik
*Attorney, Agent, or Firm*—Banner, Birch, McKie & Beckett

[57] ABSTRACT

A rotation preventing/thrust bearing device for an orbiting member type fluid displacement apparatus prevents rotation of an orbiting member during orbital motion and carries axial loads from the orbiting member. The rotation preventing/thrust bearing device of the present invention includes a fixed ring which is attached to a housing and an orbit ring which faces the fixed ring and is attached to an end surface of the orbiting piston. These rings have a plurality of corresponding pockets which face each other. Each pocket on the fixed ring faces a pocket on the orbiting ring corresponding in size, pitch and radial distance from the center of the respective rings. A predetermined number of these pockets function as rotation prevention pockets; these rotation prevention pockets have a diameter or size slightly smaller than the remaining pockets. These rotation preventing pockets cooperate with spherical balls, one of which is placed within each facing pair of corresponding pockets, to prevent rotation of the orbiting piston. Thus, while all the spherical balls carry axial loads, only a predetermined number interact with the pockets to prevent rotation of the orbiting member. This predetermined number is greater than or equal to three but smaller than the total number of balls and pockets.

7 Claims, 6 Drawing Figures

ROTATION PREVENTING DEVICE FOR A SCROLL-TYPE FLUID DISPLACEMENT APPARATUS

BACKGROUND OF THE INVENTION

This invention relates to a fluid displacement apparatus, and more particularly, to an improvement in a rotation preventing/thrust bearing device for an orbiting member fluid displacement apparatus.

There are several types of fluid displacement apparatus which utilize an orbiting piston or fluid displacing member, such as a scroll, driven by a Scotch yoke type shaft coupled to an end surface of the piston or displacing member. One such apparatus, disclosed in U.S. Pat. No. 1,906,142 to John Ekelof, is a rotary machine which has an annular eccentrically movable piston adapted to act within an annular cylinder. The annular cylinder has a radial transverse wall. One end of the wall of the cylinder is fixedly mounted. Another wall is formed as a cover disc connected to the annular piston, and is driven by a crank shaft. Other prior art apparatus of this type are shown in U.S. Pat. Nos. 801,182 and 3,500,119. Though the present invention applies to either type of fluid apparatus, i.e., using either an annular piston or a scroll-type piston, the description will be limited to a scroll type compressor. The term piston is used generically to describe a movable member of any suitable configuration within fluid displacement apparatus.

U.S. Pat. No. 801,182 (Creux) discloses a device including two scroll members each having a circular end plate and a spiroidal or involute spiral element. These scroll members are maintained angularly and radially offset so that both spiral elements interfit to make a plurality of line contacts between their spiral curved surfaces to thereby seal off and define at least one pair of fluid pockets. The relative orbital motion of the two scroll members shifts the line contacts along the spiral curved surfaces and, as a result, the volume of the fluid pockets changes. Since the volume of the fluid pockets increases or decreases dependent on the direction of the orbital motion, the scroll type fluid displacement apparatus is applicable to compress, expand or pump fluids.

Generally, in the conventional scroll type fluid displacement apparatus, one of the scroll members is fixed to a housing and the other scroll member, which is the orbiting scroll member, is eccentrically supported on a crank pin of a rotating shaft to cause orbital motion. The scroll type apparatus also includes a rotation preventing device which prevents rotation of the orbiting scroll member to thereby maintain the scroll members in a predetermined angular relationship during operation of the apparatus.

Sealing along the line contacts of the above conventional scroll type apparatus must be maintained because the fluid pockets are defined by the line contacts between the two spiral elements. As the line contacts shift along the surface of the spiral elements due to the optical motion of the orbiting scroll member, the volume of the fluid pockets changes.

Since the orbiting scroll member in conventional scroll type apparatus is supported on a crank pin in a cantilever manner, an axial slant of this orbiting scroll member occurs. Axial slant also occurs because the movement of the orbiting scroll member is not rotary motion around the center of the scroll member, but is orbiting motion caused by the eccentric movement of a crank pin driven by the rotation of the drive shaft. Several problems result from the occurrence of this axial slant including improper sealing of the line contacts, vibration of the apparatus during operation and noise caused by physical striking of the spiral elements. One simple and direct solution to this problem is the use of a thrust bearing device for carrying the axial loads. Thus, scroll type fluid displacement apparatus is usually provided with a thrust bearing device within the housing.

One recent attempt to improve the rotation preventing and thrust bearing devices in scroll type fluid displacement apparatus is described in U.S. Pat. Nos. 4,160,629 (Hidden et al) and 4,259,043 (Hidden et al). The rotation preventing and thrust bearing devices in these U.S. patents are integral with one another. The rotation preventing/thrust bearing device described in these U.S. patents (see, e.g., FIG. 7 of Hidden et al Pat. No. 4,259,043) comprises one set of indentations formed on the end surface of the circular plate of the orbiting scroll member and a second set of indentations formed on the end surface of a fixed plate attached to the housing. A plurality of balls or spheres are placed between the indentations of both surfaces. All the indentations have the same cross-sectional configuration and the center of all the indentations formed on both end surfaces are located on circles having the same radius. As a result, the machining and fabrication of these indentations to accurate dimensions is very difficult and intricate.

To avoid these latter disadvantages, an improvement of the rotation preventing/thrust bearing device is described in copending application Ser. No. 356,647 entitled "Orbiting Member Fluid Displacement Apparatus With Rotation Preventing Mechanism," which was filed on the same date as this application by Takayuki Iimori, Kiyoshi Terauchi and Seiichi Sakamoto and which is assigned to the same assignee. This application discloses a rotation preventing/thrust bearing device comprising a fixed portion, an orbit portion and a plurality of balls or spheres. The fixed portion includes a fixed race and ring and the orbit portion includes an orbit race and ring. The fixed and orbit rings have a plurality of holes or pockets; the holes on the fixed ring correspond to the holes on the orbit ring. The races are formed separately from the rings, and then they are fastened to surfaces of the housing and the orbiting scroll by fastening devices. Since the races and rings are discrete parts, the holes or pockets formed on the rings are formed by a press working process.

A large number of the pockets are formed in the rings of the above device because the rotation preventing/thrust bearing device not only prevents rotation of the orbiting scroll, and maintains the angular relationship between the scrolls, but it also supports the axial load. In view of this large number of pockets formed on the rings, and the criticality of the distance between the adjacent pockets as contrasted to the thickness of the ring, several press working processes or steps are necessary to form the pockets. However, in the press working processes, dimensional errors of pitch and size are unavoidable. Since these dimensional errors will be compounded between the rings, such dimensional errors will adversely affect the actual orbiting locus permitted by the mechanism and other operations and performance of the scroll type fluid displacement apparatus.

SUMMARY OF THE INVENTION

It is a primary object of this invention to provide an improved rotation preventing/thrust bearing device for a scroll type fluid displacement apparatus.

It is another object of this invention to provide a rotation preventing/thrust bearing device for a scroll type fluid displacement apparatus which is simple in construction and can be simply and reliably manufactured.

A scroll type fluid displacement apparatus according to this invention includes a housing and a fixed scroll fastened to the housing. The fixed scroll has a first end plate from which a first spiral wrap extends into the interior of the housing. An orbiting scroll, which is mounted within the housing, has a second end plate from which a second wrap extends. The first and second wraps interfit at an angular and radial offset to make a plurality of line contacts which define at least one pair of sealed off fluid pockets. A driving mechanism, which includes a drive shaft rotatably supported by the housing, effects the orbital motion of the orbiting scroll by the rotation of the drive shaft. A rotation preventing/thrust bearing device is connected to the orbiting scroll to prevent rotation of the orbiting scroll during orbital motion so that the fluid pockets change volume during the orbital motion of the orbiting scroll.

The rotation preventing/thrust bearing device includes a fixed ring fastened to an inner surface of the housing and an orbit ring, which faces the fixed ring and is fastened to an axial end surface of the orbiting scroll on the opposite side of the orbiting scroll from the wrap. A plurality of corresponding pockets or holes are formed in both rings. Each pocket on the fixed ring faces a pocket on the orbiting ring corresponding in size, pitch and radial distance from the center of the respective rings. A predetermined number of these corresponding pockets function as rotation preventing pockets. These rotation preventing pockets have a diameter slightly smaller than the diameter of the remaining pockets. The number of these rotation preventing pockets is greater than or equal to three, but less than the total number of pockets. A bearing element in the form of a spherical ball is placed within each pair of pockets facing each other to carry axial loads from the orbiting scroll. Furthermore, the bearing elements in the rotation preventing pockets interact with the edges of these pockets to prevent rotation of the orbiting scroll.

Further objects, features and aspects of this invention will be understood from the following detailed description of the preferred embodiment of this invention referring to the annexed drawings.

DETAILED DESCRIPTION OF THE PREFERRED EMBODIMENT

Figure 1:
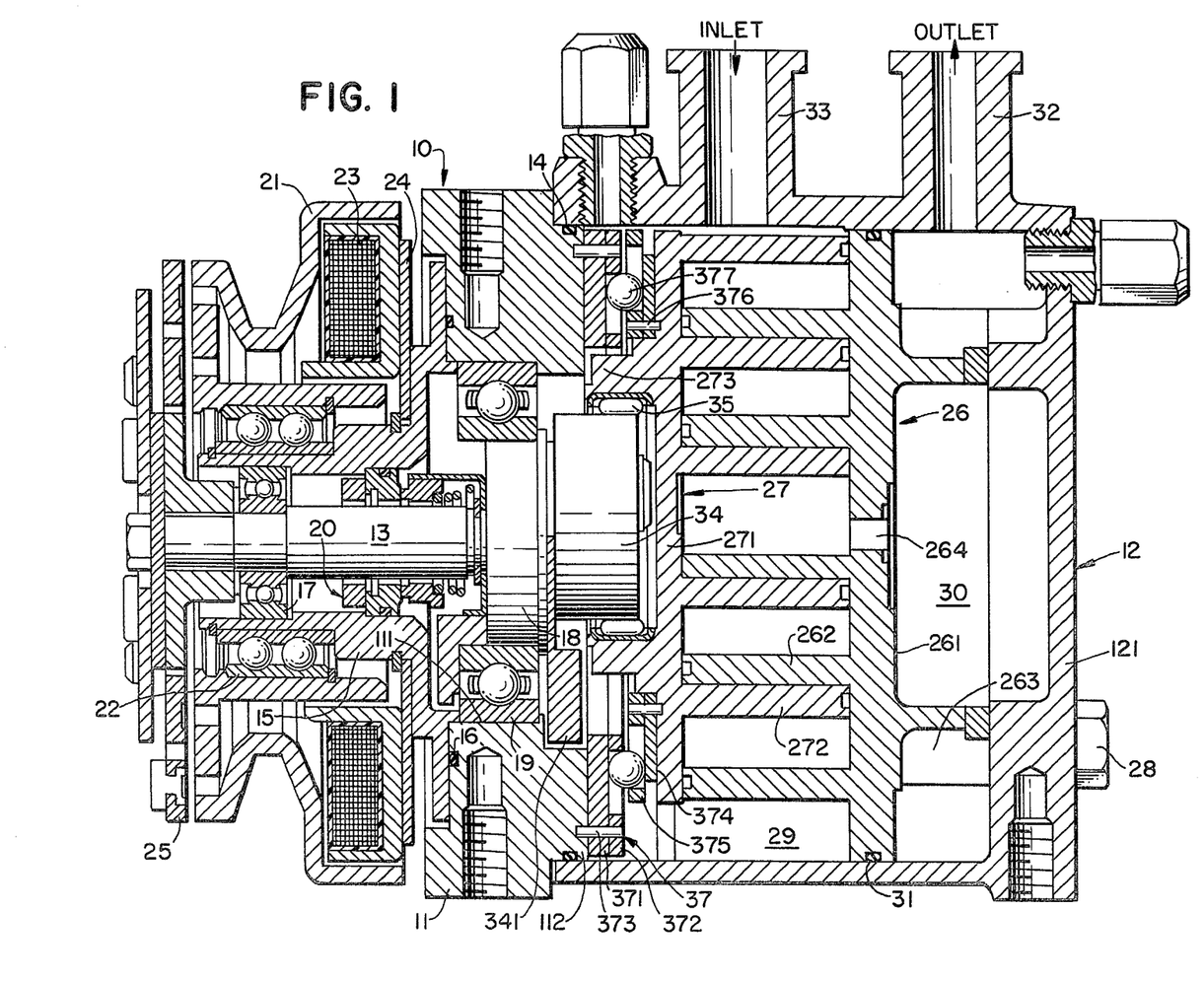
FIG. 1 is a vertical sectional view of a compressor unit according to one embodiment of this invention.

Referring to FIG. 1, a fluid displacement apparatus in accordance with the present invention, is shown in the form of a scroll type refrigerant compressor unit 1. The compressor unit 1 includes compressor housing 10 having a front end plate 11 and cup shaped casing 12 which is attached to an end surface of front end plate 11. An opening 111 is formed in the center of front end plate 11 for the penetration or passage of drive shaft 13. An annular projection 112 is formed in the rear end surface of front end plate 11 which faces cup shaped casing 12; this annular projection 112 is concentric with opening 111. An outer peripheral surface of annular projection 112 bites into an inner wall of the opening of cup shaped casing 12. Cup shaped casing 12 is fixed on the rear end surface of front end plate 11 by a fastening device, for example, bolts and nuts, so that the opening of cup shaped casing 12 is covered by front end plate 11. An O-ring 14 is placed between the outer peripheral surface of annular projection 112 and the inner wall of the opening of cup shaped casing 12 to seal the mating surface of front end plate 11 and cup shaped casing 12. Front end plate 11 has an annular sleeve 15 projecting from the front end surface thereof which surrounds drive shaft 13 and defines a shaft cavity. In the embodiment shown in FIG. 1, sleeve 15 is separated from front end plate 11; sleeve 15 is fixed to the front end surface of front end plate 11 by screws (not shown). An O-ring 16 is placed between the end surface of front end plate 11 and an end surface of sleeve 15 to seal the surface of front end plate 11 and sleeve 15. Alternatively, sleeve 15 may be integral with front end plate 11.

Drive shaft 13 is rotatably supported by sleeve 15 through a bearing 17 located near the front end of sleeve 15. Drive shaft 13 has a disk 18 at its inner end which is rotatably supported by front end plate 11 through bearing 19 located within opening 111 of front end plate 11. A shaft seal assembly 20 is coupled to drive shaft 13 within the shaft seal cavity of sleeve 15.

A pulley 21 is rotatably supported by bearing 22 which is located on an outer surface of sleeve 15. An electromagnetic coil 23 which surrounds sleeve 15, is supported by support plate 24 in an annular cavity of pulley 21. An armature plate 25 is elastically supported on the outer end of drive shaft 13 which extends from sleeve 15. A magnetic clutch includes pulley 21, magnetic coil 23, and armature plate 25. In operation, drive shaft 13 is driven by an external drive power source, for example, a vehicle engine, through a rotation force transmitting device such as the above described magnetic clutch.

A fixed scroll (fixed member) 26, an orbiting scroll (orbiting member) 27, a driving mechanism for orbiting scroll 27 and a rotation preventing/thrust bearing device for orbiting scroll 29 are located within an inner chamber of cup shaped casing 12. The inner chamber is formed between the inner wall of cup shaped casing 12 and front end plate 11.

Fixed scroll 26 includes circular end plate 261, a wrap or spiral element 262 affixed to or extending from one side surface of circular end plate 261 and a plurality of internally threaded bosses 263 axially projecting from the other end surface of circular plate 261. An axial end surface of each boss 263 is seated on the inner surface of an end plate 121 of cup shaped casing 12 and fixed by bolts 28. Hence, fixed scroll 26 is fixed within cup shaped casing 12. Circular plate 261 of fixed scroll 26 divides the inner chamber of cup shaped casing 12 into a discharge chamber 30 and a suction chamber 29. A seal ring 31 is connected between the outer peripheral surface of circular plate 261 and the inner wall of cup shaped casing 12. A hole or discharge port 264 is formed through circular plate 261 at a position near the center of spiral element 262; discharge port 264 is connected between the central fluid pocket of the spiral element 262 and discharge chamber 30.

Orbiting scroll 27 also includes a circular end plate 271 and a wrap or spiral element 272 affixed to or extending from one side surface of circular end plate 271. Spiral element 272 and spiral element 262 of fixed scroll 26 interfit at an angular offset of 180° and a predetermined radial offset. At least a pair of fluid pockets are thereby defined between both spiral elements 262 and 272. Orbiting scroll 27, which is connected to the drive mechanism and to the rotation preventing/thrust bearing means device, is driven in an orbital motion at a circular radius Ro by rotation of drive shaft 13 to thereby compress fluid passing through the compressor unit. Generally, radius Ro of orbital motion is given by the following formula $$R_o = \frac{\text{(pitch of spiral element)} - 2(\text{wall thickness of spiral element})}{2}.$$

Figure 6:
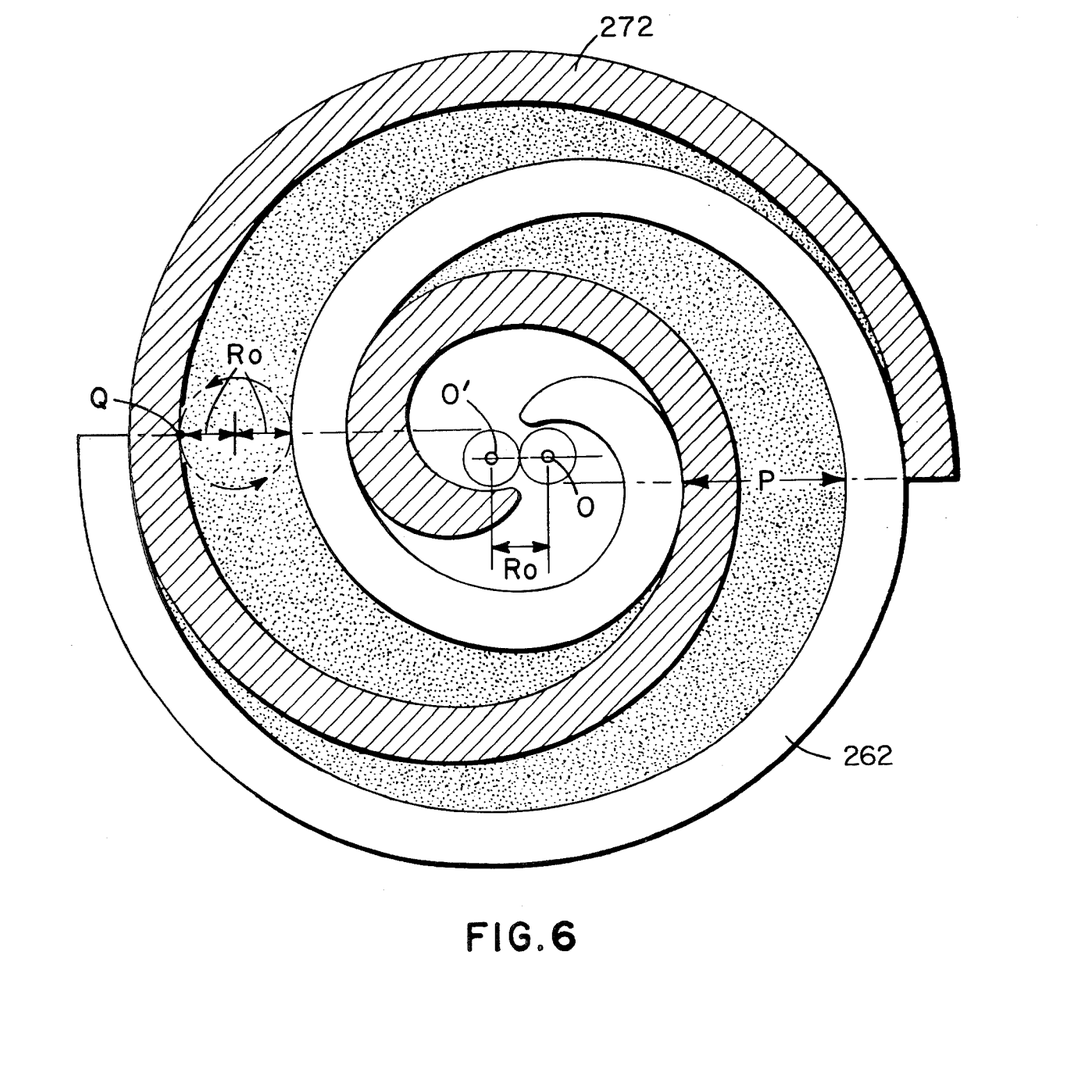
FIG. 6 is a diagrammatic sectional view illustrating the spiral elements of the fixed and orbiting scrolls.

As shown in FIG. 6, the pitch (P) of the spiral elements can be defined by $2\pi r_g$, where $r_g$ is the involute generating circle radius. The radius of orbital motion Ro is also illustrated in FIG. 6 as the locus of an arbitrary point Q on orbiting scroll 27. The spiral element 272 is radially offset from spiral element 262 of fixed scroll member 26 by the distance Ro. Thus, orbiting scroll 27 undergoes orbital motion of a radius Ro upon rotation of drive shaft 13. As the orbiting scroll 27 orbits, the line contacts between spiral elements 262 and 272 moves toward the center of the spiral elements along the surfaces of the spiral elements. The fluid pockets, which are defined by spiral elements 262 and 272, also move to the center with a consequent reduction in volume and compression of the fluid in the fluid pockets. The fluid or refrigerant gas, which is introduced into suction chamber 29 from an external fluid circuit through inlet port 33, is drawn into the fluid pockets formed between spiral elements 262 and 272 from the outer ends of the spiral elements. As orbiting scroll 27 orbits, fluid in the fluid pockets is compressed and compressed fluid is discharged into discharge chamber 30 from the central fluid pocket of the spiral elements through hole 264. The fluid then is discharged to the external fluid circuit through an outlet port 32.

Figure 2:
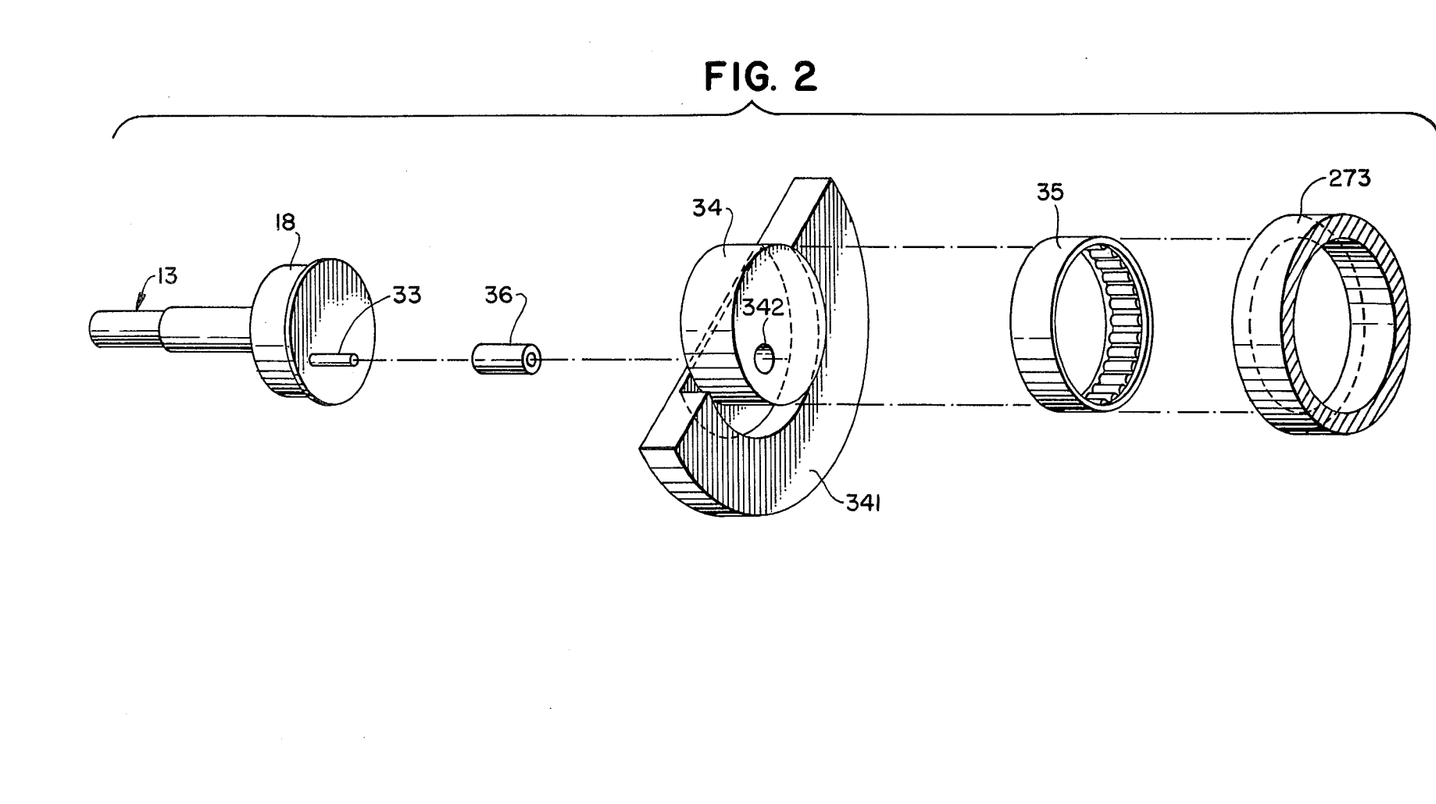
FIG. 2 is an exploded perspective view of the driving mechanism in the embodiment of FIG. 1.

Referring again to FIGS. 1 and 2, the driving mechanism of orbiting scroll 26 will now be described in greater detail. Drive shaft 13, which is rotatably supported by sleeve 15 through bearing 17, is connected to disk 18. Disk 18 is rotatably supported by front end plate 11 through bearing 19 disposed within opening 111 of front end plate 11. A crank pin or drive pin 33 axially projects from an axial end surface of disk 18 at a position which is radially offset from the center of drive shaft 13. Circular plate 271 of orbiting scroll 27 has a tubular boss 273 axially projecting from the end surface opposite the surface from which spiral element 272 extends. A discoid or short axial bushing 34 fits into boss 273 and is rotatably supported therein by a bearing, such as a needle bearing 35. Bushing 34 has a balance weight 341 which has the shape of a semi-disk or ring radially connected to bushing 34 along a front surface thereof. An eccentric hole 342 is formed in bushing 34 at a position radially offset from the center of bushing 34. Drive pin 33 fit into eccentric hole 342 together with bearing 36. Bushing 34, which is driven by the revolution of drive pin 33, rotates within a bearing 35.

Now, the rotation of orbiting scroll 27 is prevented by a rotation preventing/thrust bearing device 37 which is positioned between the inner wall of housing 10 and circular plate 271 of orbiting scroll 27 and around boss 273 of orbiting scroll 27. As a result, orbiting scroll 27 orbits while maintaining its angular orientation relative to the fixed scroll.

Figure 3:
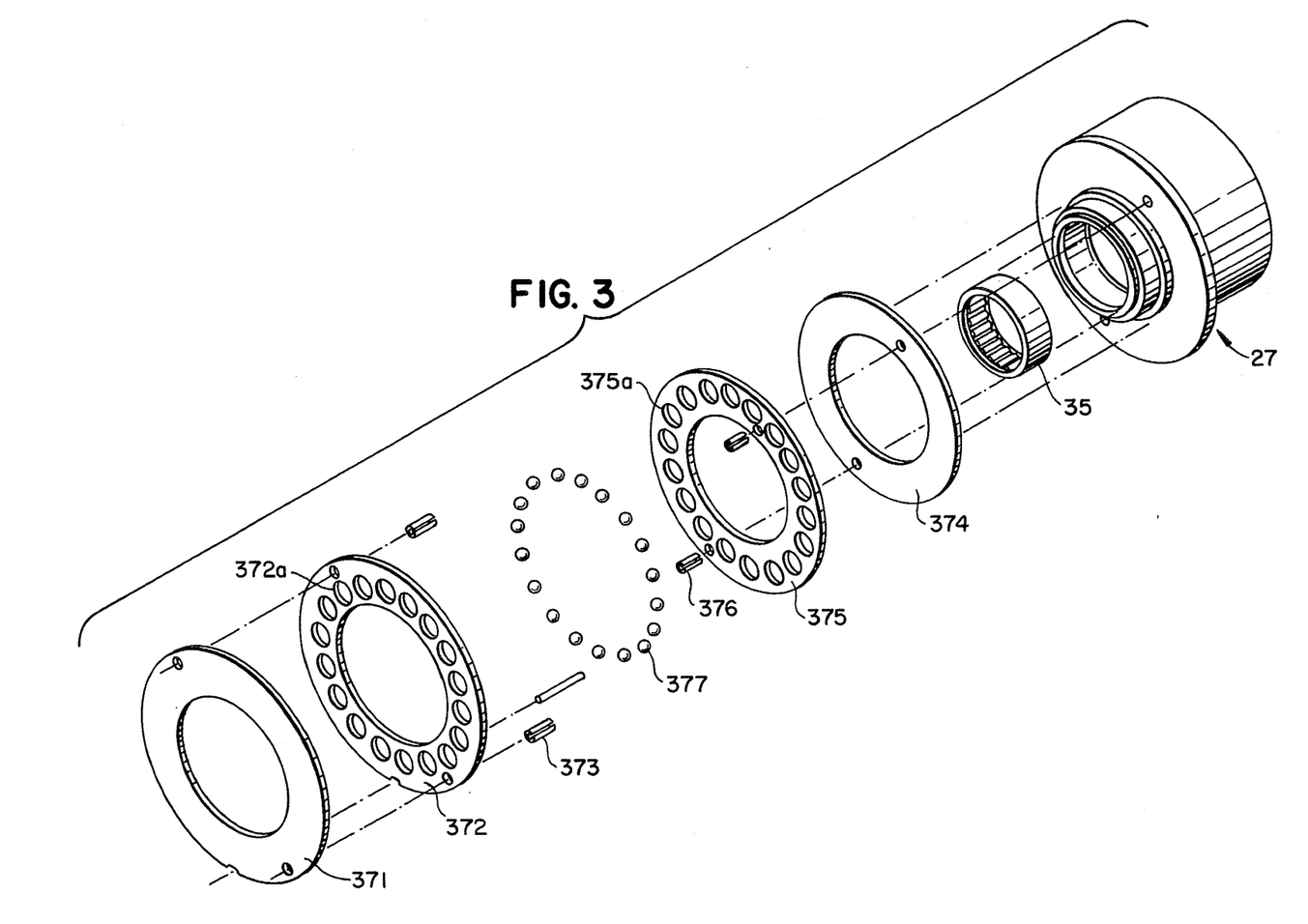
FIG. 3 is an exploded perspective view of the rotation preventing/thrust bearing device in the embodiment of FIG. 1.

Referring to FIG. 1 and FIG. 3, rotation preventing/thrust bearing device 37 will now be described in greater detail. Rotation preventing/thrust bearing device 37 includes a orbiting portion, a fixed portion and a plurality of balls. The fixed portion includes (1) an annular fixed race 371 having one end surface fitted against the axial end surface of annular projection 112 of front end plate 11 and (2) a fixed ring 372 fitted against the other end surface of fixed race 371 to cover the end surface of fixed race 371. Fixed race 371 and ring 372 are attached to the axial end surface of annular projection 112 by pins 373. The orbiting portion also includes (1) an annular orbit race 374 which is fitted against the end surface of circular plate 271 and (2) an orbit ring 375 fitted against the end surface of orbit race 374 to cover the end surface of orbit ring 374. A small clearance is maintained between the end surface of fixed ring 372 and the end surface of orbit ring 375. Orbit race 374 and ring 375 are attached to the end surface of circular plate 271 by pins 376. Alternatively, the rings 372, 375 may be integral with the races.

Fixed rings 372 and orbit ring 375 each have a plurality of holes or pockets 372a, 375a in the axial direction, the number of holes or pockets in each ring 372, 375 being equal. The holes or pockets 372a on the fixed ring 372 correspond to or are a mirror image of the holes or pockets 375a on the orbits ring 375, i.e., each pair of pockets facing each other have the same size and pitch, and the radial distance of the pockets from the center of their respective rings 372 and 375 is the same, i.e., the centers of these pockets are located the same distance from the center of the rings 372 and 375. Thus, if the centers of rings 372 and 375 were aligned, which they are not in actual operation of rotation preventing/thrust bearing device 37, the holes or pockets 372a and 37a would be identical or in alignment. Bearing elements, such as a plurality of balls 377, are placed between the pockets 372a of fixed ring 372 and pockets 375a of orbit ring 375, each of which face one another at a predetermined clearance.

The rotation of orbiting scroll 27 is prevented by balls 377 while the angular relationship between fixed scroll 26 and orbiting scroll 27 is maintained. Moreover, the axial thrust load from orbiting scroll 27, which is caused by the reaction force of the compressed gas, is carried by fixed race 371, orbit race 374 and balls 377.

Figure 4:
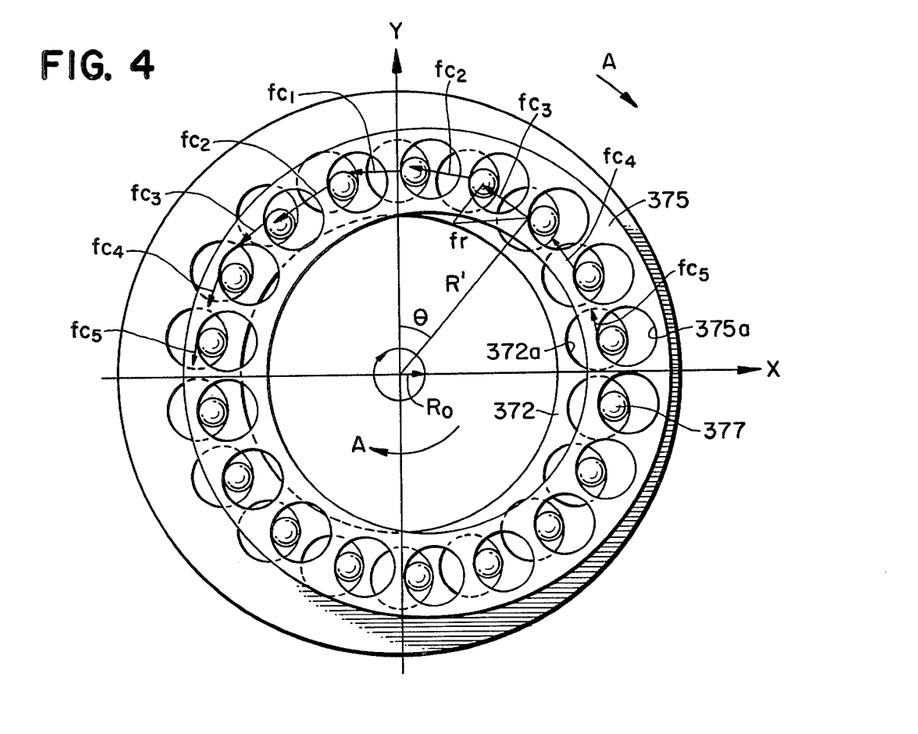
FIG. 4 is a diagrammatic front view of the rotation preventing/thrust bearing device illustrating the manner by which rotation is prevented.

Referring to FIG. 4, the operation of rotation preventing/thrust bearing device 37 will be described. In FIG. 4, the center of orbiting ring 375 is placed at the right side and the direction of rotation of the drive shaft is clockwise, as indicated by arrow A. When orbiting scroll 27 is driven by the rotation of the drive shaft, the center of orbiting ring 375 orbits about a circle of radius Ro (together with orbiting scroll 27). However, a rotating force, i.e., moment, which is caused by the offset of the acting point of the reaction force of compression and the acting point of the drive force, acts on orbiting scroll 27. This reaction force tends to rotate the orbiting scroll 27 in the clockwise direction about the center of orbit ring 375. But, as shown in FIG. 4, eighteen balls 377 are placed between the corresponding pockets 372a and 375a of rings 372 and 375. In the position shown in FIG. 4, the interaction between the nine balls 377 in the top half of the rotation preventing/thrust bearing device and the edges of the pockets 372a and 375a prevents rotation of orbiting scroll 27. The magnitude of the rotation preventing forces for the top half of the rotation preventing/thrust bearing device are shown by force vectors $fc_1$–$fc_5$ in FIG. 4. In any given position of the orbiting scroll 27 and orbit ring 375 about the orbit radius Ro, only half the balls 377 and pockets 372a and 375a function to prevent rotation of the orbiting scroll 27, and to varying degrees as illustrated by the magnitude of force vectors $fc_1$–$fc_5$; however, all the balls carry the axial thrust load from orbiting scroll 27. Therefore, according to the present invention, a minimum of only three equally spaced pockets are required to prevent rotation of orbiting scroll 27.

Three or more rotation prevention pockets are formed on each of rings 372 and 375. These rotation prevention pockets have a substantially exact diameter to allow orbiting motion of the orbiting scroll in a predetermined radius, whereas the diameter of the remaining pockets 372a and 375a is slightly larger than the diameter of the rotation prevention pockets. The rotation prevention pockets all have the same diameter and the centers of these pockets are located the same distance from the centers of rings 372 and 375. Thus, the rotation prevention pockets on the orbit ring 375 correspond in position and size to the rotation prevention pockets on the fixed ring 372. These rotation prevention pockets carry the rotation prevention force. The remaining pockets on ring 372 are almost identical in size and location to the remaining pockets on ring 375. These remaining pockets, and the balls placed between these pockets, are used only to carry the axial load from the orbiting scroll 27.

Figure 5:
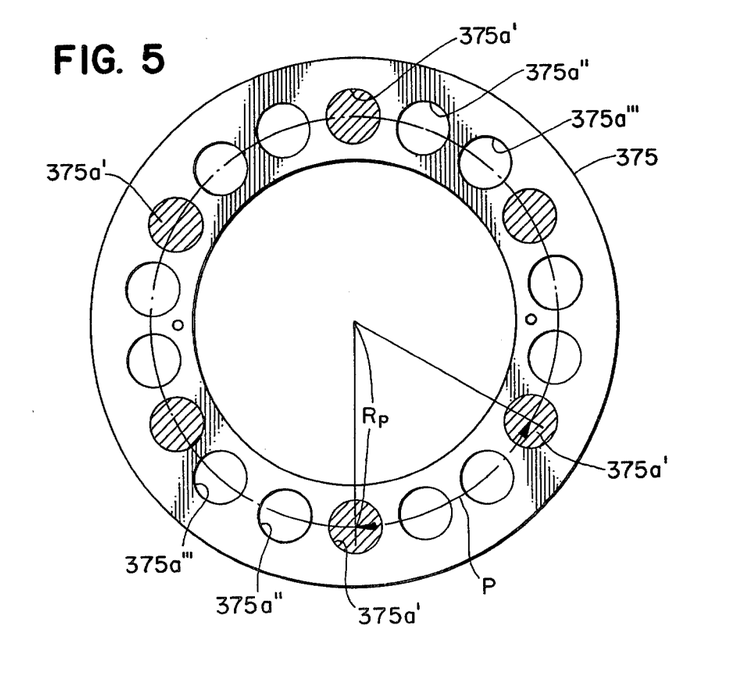
FIG. 5 is a front view of the orbit ring of the rotation preventing/thrust bearing device illustrating the arrangement of pockets or holes.

A further illustration of the arrangement of the pockets on the orbit and fixed rings of the present invention is given in FIG. 5. In this embodiment of the invention, holes or pockets are formed on the ring 375 (the arrangement of pockets on ring 372 corresponds to the arrangement shown in FIG. 5). These pockets can be formed by press working as will be explained below. Six pockets 375a' (shown by cross hatching in FIG. 5) are the rotation prevention pockets, which are precisely formed in a first press working process. These pockets have the same diameter and their centers are the same distance from the center of ring 375. Six pockets 375" of the remaining twelve pockets are formed in a second press working process and the remaining six pockets 375''' are formed in a third press working process. Since the pockets 375" and 375''' primarily function, together with balls 377, to carry the axial load, these pockets do not require the precise tolerances required by pockets 375' and also, the diameter of the twelve pockets 375" and 375''' is slightly greater than the diameter of the six pockets 375' which permits simpler and less expensive fabrication and production.

Other manufacturing methods for the rings, such as machining and grinding, can be used with the same advantage.

According to this invention, as described above, the pockets which function as rotation prevention pockets are precisely formed and the remaining pockets require less precise processing. Thus, dimensional errors can be minimized in the fabrication of both the fixed and orbiting rings to thereby obtain a more precise orbital circle for the orbiting scroll.

This invention has been described in detail in connection with the preferred embodiment, but this is an example only and the invention is not restricted thereto. It will be easily understood by those skilled in the art that other variations and modifications can be easily made within the scope of this invention.

I claim:

1. In an orbiting member type fluid displacement apparatus including a housing having a front end plate, a fixed member attached to or integral with said housing, an orbiting member having an end plate from which an annular member extends, said fixed and orbiting members interfitting at a radial offset to make a line contact to separate a fluid outlet from a fluid inlet, and a driving mechanism including a rotatable drive shaft connected to said orbiting member to drive said orbiting member in an orbital motion, a rotation preventing/thrust bearing means connected to said orbiting member for carrying axial loads from said orbiting member and preventing the rotation of said orbiting member so that the line contact moves toward the discharge side during orbital motion, said rotation preventing/thrust bearing means including a fixed ring fastened to an inner surface of said housing and an orbiting ring fastened to an axial end surface of said end plate of said orbiting member facing said fixed ring, said fixed and orbiting rings having a plurality of corresponding circular pockets, each pocket on said fixed ring facing a pocket on said orbiting ring corresponding in size, pitch and radial distance, said rotation preventing/thrust bearing means further including a bearing element placed within each facing pair of said corresponding pockets, said corresponding pockets including a predetermined number of rotation preventing pockets on each of said fixed and obtaining rings for interacting with said bearing elements to prevent rotation of said orbiting member during orbital motion, said rotation prevention pockets having a diameter slightly smaller than the diameter of the remaining ones of said corresponding pockets so that said remaining ones of said corresponding pockets do not interact with the bearing elements to prevent the rotation of said orbiting member during orbital motion, the predetermined number of said rotation prevention pockets being smaller than the total number of said corresponding pockets and equal to or greater than three.

2. In a scroll type fluid displacement apparatus including a housing having a front end plate, a fixed scroll attached to said housing and having a first end plate from which a first wrap extends into said housing, an orbiting scroll having a second end plate from which a second wrap extends, said first and second wraps interfitting at an angular and radial offset to make a plurality of line contacts to define at least one pair of sealed off fluid pockets, and a driving mechanism including a rotatable drive shaft connected to said orbiting scroll to drive said orbiting scroll in an orbital motion, a rotation preventing/thrust bearing means connected to said orbiting scroll for carrying axial loads from said orbiting scroll and preventing the rotation of said orbiting scroll so that the volume of the fluid pockets changes during orbital motion, said rotation preventing/thrust bearing means including a fixed ring fastened to an inner surface of said housing and an orbiting ring fastened to an axial end surface of said second end plate of said orbiting scroll facing said fixed ring, said fixed and orbiting rings having a plurality of corresponding circular pockets, each pocket on said fixed ring facing a pocket on said orbiting ring corresponding in size, pitch and radial distance, said rotation preventing/thrust bearing means further including a bearing element placed within each facing pair of said corresponding pockets, said corresponding pockets including a predetermined number of rotation prevention pockets on each of said fixed and orbiting rings for interacting with said bearing elements to prevent rotation of said orbiting scroll during orbital motion, said rotation prevention pockets having a diameter slightly smaller than the diameter of the remaining ones of said corresponding pockets so that the remaining ones of said corresponding pockets do not interact with the bearing elements to prevent the rotation of said orbiting scroll during orbital motion, the predetermined number of said rotation prevention pockets being smaller than the total number of said corresponding pockets and equal to or greater than three.

3. The scroll type fluid displacement apparatus of claim 2 wherein the predetermined number of said rotation preventing pockets is six and the total number of said corresponding pockets is eighteen.

4. The scroll type fluid displacement apparatus of claim 2 wherein said bearing elements are spherical balls.

5. The scroll type fluid displacement apparatus of claim 2 wherein said rotation prevention pockets have an equal angular spacing on said fixed and orbiting rings.

6. The scroll type fluid displacement apparatus of claim 2 wherein all of said bearing elements are centered about a single plane extending medially of said fixed and orbiting rings.

7. The scroll type fluid displacement apparatus of claim 2 wherein the axial loads from said orbiting scroll are carried by all of said bearing elements.

* * * * *

UNITED STATES PATENT AND TRADEMARK OFFICE
CERTIFICATE OF CORRECTION

PATENT NO. : 4,468,181
DATED : August 28, 1984
INVENTOR(S) : Seiichi Sakamoto

It is certified that error appears in the above—identified patent and that said Letters Patent is hereby corrected as shown below: On the title page Change the title from "ROTATION PREVENTING DEVICE FOR A SCROLL-TYPE FLUID DISPLACEMENT APPARATUS" to --AN IMPROVED ROTATION PREVENTING DEVICE FOR A SCROLL-TYPE FLUID DISPLACEMENT APPARATUS--.

Signed and Sealed this

Twelfth Day of March 1985

[SEAL]

Attest:

DONALD J. QUIGG

*Attesting Officer*  *Acting Commissioner of Patents and Trademarks*